United States Patent [19]

Stoka

[11] Patent Number: 4,537,288
[45] Date of Patent: Aug. 27, 1985

[54] SPOT-TYPE DISC BRAKE FOR AUTOMOTIVE VEHICLES

[75] Inventor: Roberto Stoka, Nauheim, Fed. Rep. of Germany

[73] Assignee: ITT Industries, Inc., New York, N.Y.

[21] Appl. No.: 528,396

[22] Filed: Sep. 1, 1983

[30] Foreign Application Priority Data

Oct. 9, 1982 [DE] Fed. Rep. of Germany ....... 3237515

[51] Int. Cl.³ .............................................. F16D 65/54
[52] U.S. Cl. ................................. 188/71.8; 188/196 P
[58] Field of Search ................. 188/71.8, 71.44, 71.45, 188/196 P; 192/111 A

[56] References Cited

U.S. PATENT DOCUMENTS

| | | | |
|---|---|---|---|
| 3,338,354 | 8/1967 | Jeffries | 188/71.8 X |
| 3,339,683 | 9/1967 | Burnett | 188/71.8 X |
| 3,952,840 | 4/1976 | Yamazaki et al. | 188/71.8 |
| 4,436,186 | 3/1984 | Ritsema et al. | 188/71.8 |

*Primary Examiner*—Duane A. Reger
*Attorney, Agent, or Firm*—James B. Raden

[57] ABSTRACT

A spot-type disc brake for automotive vehicles, having brake shoes arranged on both sides of a brake disc. A brake support member receives the brake torque. The support member bears guide rods in which a brake caliper which straddles the brake disc is guided slidably on the brake support member. The brake caliper is provided with an actuating device to urge the brake shoes against the brake disc. The brake caliper is resiliently preloaded in the brake's release direction and with the spring force being maintained constant independently of the pad thickness by the position of a friction element that is slidably supported at the brake support member. After braking actions that result in an elastic expansion of the brake caliper, there is available a sufficient brake clearance immediately upon termination of the braking action, by the use of the friction element being arranged in a sleeve to allow axial movement by the amount of the clearance. The sleeve provides for the guiding of the brake caliper such that the brake caliper is movable an additional length in the brake's release direction, which latter length corresponds at least to the potential elastic expansion of the brake caliper.

9 Claims, 2 Drawing Figures

SPOT-TYPE DISC BRAKE FOR AUTOMOTIVE VEHICLES

BACKGROUND OF THE INVENTION

The present invention relates to a spot-type disc brake, primarily for automotive vehicles. Brake shoes are arranged on either side of the brake disc. A brake support member receiving the brake torque supports the guide rods on which a brake caliper is guided slidably on the brake support member straddling the brake disc. The brake caliper is provided with an actuating device to urge the brake shoes against the brake disc. The brake caliper is resiliently biased in the brake release direction by means of spring whose force is maintained constant independently of the pad thickness. A friction element that is slidably supported on the guide rod relative to the brake support member is positioned to maintain the spring force constant.

A spot-type disc brake of this kind is known from the German printed and published patent application No. 24 14 174. Friction discs are used in the known device which serve as braces for a spring force applied to the brake caliper. When on account of the degree of wear of the pad, the slide of the brake caliper exceeds the distance between the friction disc and a stop in the release position of the brake, the friction disc is shifted so that the amount of spring force applied to the brake caliper is constant at all times. On releasing the brake, the brake caliper is forced back for a determined length in the direction of the brake release to ensure that the brake shoe travels back and away from the brake disc by a determined brake clearance after each normal braking action.

In the event of braking actions with extremely high actuating forces, the brake caliper, too, is as a rule subject to elastic deformation. This kind of expansion of the brake caliper on so-called emergency braking operations may lead to the friction disc being shifted back excessively since the elastic deformation of the brake caliper simulates a wear of the brake pad which has not really occured. It may therefore well be that after an emergency braking, the brake caliper although being forced back by the amount of the brake clearance, nevertheless abuts against the brake disc after the brake has been released. The disc brake will in this case be restored to normal condition only when the pad thickness has decreased by the brake clearance. However, this abrasive action causes an undesirable heating of the brake device. Moreover, the brake pad is worn to an extent greater than necessary for proper braking. In addition, brake action of this type obviously leads to an alteration of the vehicle behaviour especially in terms of the acceleration of characteristics. Furthermore, the work performed during the abrasive action has to be balanced additionally by the driving engine.

SUMMARY OF THE INVENTION

It is, therefore, an object of the present invention to design a spot-type disc brake of the type described, safeguarded by structurally simple means that restores sufficient brake clearance even immediately after a braking action which caused an elastic expansion of the brake caliper.

According to the present invention, this object is attained in that a friction element is arranged in a sleeve with axial clearance to allow axial movement by the amount of the clearance. The sleeve guides the brake caliper in such a manner that the brake caliper is movable an additional length in the brake's release direction, which latter corresponds at least to the potential elastic expansion of the brake caliper. During normal operation of the brake, i.e. without any considerable amount of elastic expansion of the brake caliper, the sleeve will remain at rest in a guide of the brake caliper. The friction element steadily adapts itself to the wear of the pad and constantly maintains necessary brake clearance by means of a compression spring. In the event of a braking action causing very high actuating forces, the brake caliper expands bringing the friction element into a position which corresponds to a more advanced degree of wear of the pad. The sleeve which accomodates the friction element is enabled to move in the guide of the brake caliper in the release direction of the brake so that the brake clearance is adjusted exclusively by the run-out of the disc. Although in an operating condition of this kind, the spring tension-aided adjustment of the brake clearance is cancelled, the brake pads continue to be maintained in abutment with the brake disc at the end of the braking operation.

The subject of the present invention is capable of a further improvement by supporting the sleeve in a resilient way on the guide rod by means of an elastic body of substantially hollow cylindrical configuration. Thus, any tolerances determined by manufacturing techniques no longer have any effect.

By this construction, the guide rods, will not hit against the parts by which they are guided due to vibrations or shock. Undesirable noises and an increased material wear are thereby reduced. To minimize the amount of force necessary for the sliding movement of the brake caliper, a sliding body situated between the rubber elastic body and the guide rod is employed. A structurally simple design is, then, achieved by providing a sleeve which protrudes through a guide opening of the brake caliper, with a projecting annular collar at its end facing the brake support member. The annular collar is located a distance from the brake caliper. That distance is maintained as long as the position of the friction element corresponds to the pad thickness. Only when the brake caliper is elastically expanded due to an extreme braking action will the sleeve slide in the guide opening of the brake caliper in such a way that the annular collar of the sleeve strikes against the brake caliper. By the present design, an elastic damping ring is arranged between the projecting annular collar of the sleeve and the brake caliper, to greatly soften the striking of the annular collar of the sleeve against the brake caliper. In its simplest form, the aforementioned damping ring can be in the shape of a rubber elastic annular body. Further, the distance between the radial annular collar and the brake caliper may be adjusted by the damping ring.

According to a further improvement, the friction element will engage the guide rod enabling the friction element to be lifted from the guide rod by an expansion element.

This improved design allows the release of the guide rod from the engagement of the friction element in the event of a change of the pad so that the frictional forces of the friction element are ineffective at that moment. The friction element may be configured in a great variety of configurations. For instance, a slotted annular disc can be used as a friction element, which engages the guide rod with a constructionally determined radial compressive force. The compressive force is thus determined by the specific elasticity of the annular disc. When the annular disc may be furnished with radial recesses into which counter-tapers of the expansion element allow to be introduced. In this context, the end of the sleeve which faces away from the brake support member is, advantageously provided with a cup-shaped sealing cap preferably made of rubber elastic material. In this design, it is rendered possible to act on the expansion element with a percussion tool through the rubber elastic cap in order to lift the friction element from the guide rod before a necessary change of the pad. In addition, the cup-shaped sealing cap of rubber elastic material serves to prevent the penetration of dirt into the guide during operation and a consequent increase of the sliding forces.

Alternatively, an axially slotted tubular body may be employed as a friction element. A further advantage is obtained when the end of the tubular body which faces away from the brake support member has an outwardly extending radial enlargement and is expansible by means of a screw element which may very well remain on the guide rod permanently. The screw element may be fitted with a hexagon nut for ease in reaming out the tubular body. In this way, the change of the brake pads is not rendered difficult, with no obstacles produced by the inventive device.

BRIEF DESCRIPTION OF THE DRAWING

The present invention will be described in more detail in the following with reference to FIGS. 1 and 2 of the accompanying drawing, in which.

DETAILED DESCRIPTION

Figure 1:
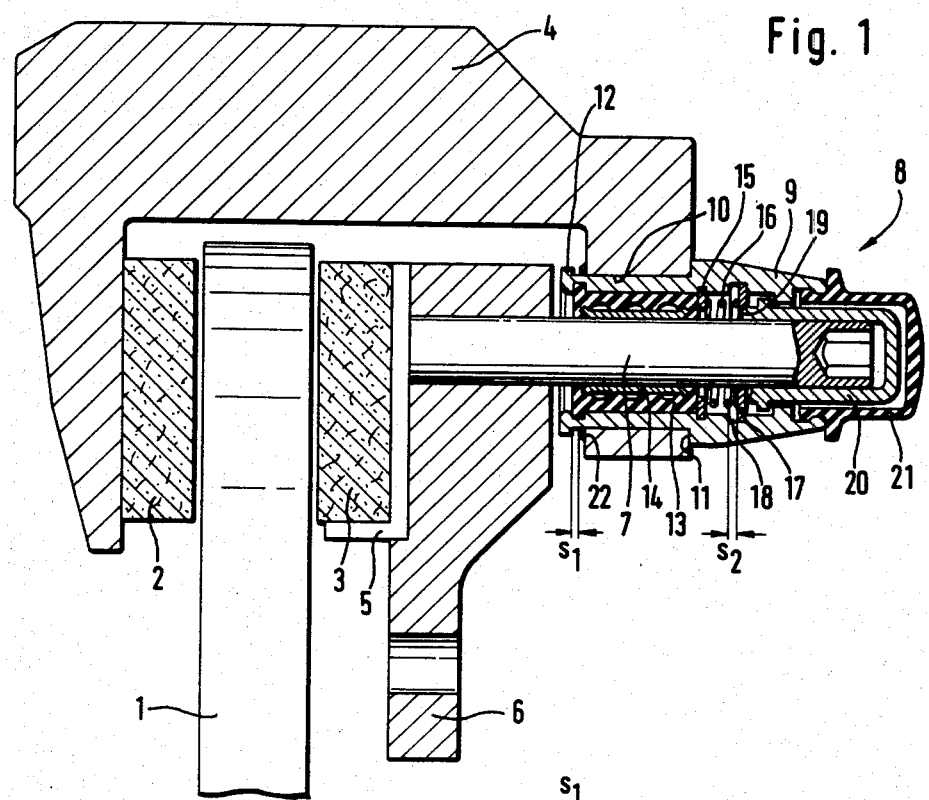
FIG. 1 is a cross-section of a spot-type disc brake.

In FIG. 1 is shown a brake disc 1 with two brake shoes 2, 3. The lefthand brake shoe 2 as viewed in the drawing is fixed rigidly to a fixed jaw of a brake caliper 4, while the brake shoe 3 shown in the drawing on the right-hand side of the brake disc 1 is guided slidable in an axial direction by a guide surface 5 of a brake support member 6 which is rigidly connected to the vehicle frame. The brake shoe 3 is pressed against the brake disc 1 by means of a hydraulic piston (not shown).

A guide rod 7 rigidly secured to the brake support member 6 extends substantially normally from the brake disc 1 and is supported in a clearance adjusting device 8 in an axially slidable manner.

The clearance adjusting device 8 is essentially constituted by a sleeve 9 which is guided in a guide sleeve opening 10 of the brake caliper 4 and is slidable axially in the guide opening 10 a distance s1 which is defined by a shoulder 11 of the sleeve and a radially outwardly projecting annular collar 12 of the sleeve. The sleeve 9 internally accomodates a substantially hollow cylindrical body 13 of rubber elastic material which is supported unmovably in axial direction in the sleeve 9 and which at its inner tubular surface bears a sliding body 14 which comes into contact with the guide rod 7. The righthand front face of the rubber elastic hollow body 13 as viewed in FIG. 1 is loaded via a Truarc lock ring 15 by a compression spring 16 which at its opposite end rests against a friction element 17 in the shape of a slotted annular disc which clings to the guide rod 7 with a radial preload. The outer marginal range of the friction element 17 engages with a circumferential groove 18 of the sleeve 9 which is sized in the axial direction to render the sleeve 9 slidable axially by a distance s2 without change of position of the friction element 17. Distance s2 is defined by the friction element 17 furnished with at least two spaced slots 19 distributed over the element circumference and into which counter-tapers of an expansion element 20 are fitted to render the element 20 supported slidably in an axial direction on the guide rod 7. The open end of the sleeve 9 which is situated on the righthand side, viewing the drawing, is covered by a cup-shaped sealing cap 21 of rubber elastic material.

The mode of operation of the described spot-type disc brake is explained in more detail as follows. The operation starts from the released condition of the brake as illustrated in FIG. 1. When the brake is actuated, the brake shoe 3 that is guided at the brake support member 6, is urged against the brake disc 1 by means of the hydraulic actuating element (not shown). The movable body of the brake caliper 4 as a whole shifts to the right so that the lefthand brake shoe 2 is brought into contact with the brake disc 1. By this movement, the brake caliper 4 shifts the sleeve 9 by the distance s2, which corresponds to the brake clearance. An increase of the actuating hydraulic force boosts the contact pressure of the brake shoes 2,3 against the brake disc 1 so that a braking torque becomes effective. When the pad thickness diminishes on account of the wear of the brake pad; due to the axial bounding surfaces of the circumferential groove 18, the friction element 17 is always pushed into a position in which the force of the compression spring 16 in the direction of the brake's release is constant and in which the friction element 17, in the brake's release position, abuts against the righthand axial bounding surface of the circumferential groove 18 of the sleeve 9.

On a braking action with very high actuating forces, the brake caliper 4 is elastically expanded, the friction element 17 is shifted in a way as would be the case if the pad wear was minor. Consequently, the friction element 17, in the brake release position, no longer abuts against the righthand axial bounding surface of the circumferential groove 18 of the sleeve 9, as shown, but instead assumes an intermediate position in the circumferential groove 18, abutting against the lefthand axial bounding surface of the sleeve 9. A sufficient clearance is now produced by the sleeve 9 having shifted additionally by distance of the sliding length s1 in the direction of the brake release so that the brake pads 2,3 are lifted from the brake disc 1. This additional reset of the sleeve 9 by the length s1 is effected by the run-out of the disc 1.

Figure 2:
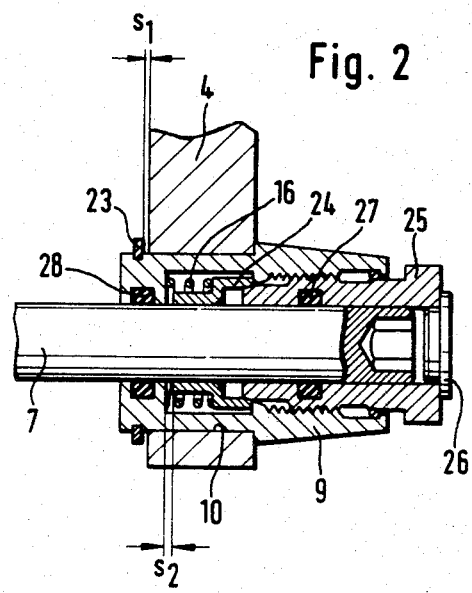
FIG. 2 is a cross-section of an alternative version of a guide of the brake caliper.

The embodiment illustrated in FIG. 2 shows an encircling clip 23 being fitted in a groove in the sleeve 9 and situated at a distance s1 from the brake caliper 4 in the brake release position as illustrated. A tubular body 24 is employed as a friction element, the tubular body 24 being slotted axially and biased by the force of the compression spring 16 to produce the brake clearance s2 relative to sleeve 9.

The righthand end of the tubular body 24 as viewed in FIG. 2 is enlarged outwardly in radial direction and is situated opposite an externally threaded element 25 whose tip end is tapered to enable the tip end of element 25 to be screwed into the enlarged end of the tubular body 24 effecting an expansion of the latter. The screw element 25 is designed as a hollow tubular body whose outermost end is enclosed by a sealing cap 26 preferably of rubber elastic material which can be positioned on the guide rod 7 by means of a thread. The drawing of FIG. 2 also shows sealing rings 28, within grooves incised into the bore of sleeve 9 and bearing against the guide rod 7 to prevent the penetration of dust particles into the housing.

When actuating the brake of FIG. 2, the brake caliper 4 with the sleeve 9 is again shifted to the right until the brake clearance s2 has been recovered. If on an extreme stress condition, the brake caliper 4 should be expanded, the tubular body 24 is shifted farther than would be necessary. During the brake release procedure, the necessary brake clearance s2 will therefore no longer be adjusted. The run-out of the brake disc 1 will, however, have the effect that the brake caliper 4 may move an additional sliding length s1 in the direction of release of the brake so that a sufficient brake clearance will nevertheless be brought about.

What is claimed is:

1. A spot type disc brake for an automotive vehicle having a brake shoe on each side of a brake disc, and including a brake caliper straddling the brake disc and the brake shoes, a brake support member secured to the vehicle frame for receiving braking torque, a guide rod for slidably guiding the brake caliper on the brake support member, said brake caliper being provided with an actuating device to urge the brake shoes against the brake disc, said caliper being resiliently biased in the brake release direction and a friction element slidably supported by the brake support member for maintaining the resilient force constant independent of the thickness of pads on the brake shoes bearing against the brake disc, wherein said friction element is mounted within a tubular sleeve allowing movement of the element in an axial direction in a limited clearance dimension, and means on said sleeve for guiding the caliper to enable movement of said caliper axially in a brake release direction a distance corresponding to the elastic expansion of the brake caliper in which the sleeve protrudes through a guide opening of the brake caliper and is provided with a projecting annular collar located at a distance from the brake caliper corresponding to the limited clearance dimension.

2. Spot-type disc brake as defined in claim 1, wherein the sleeve is supported in a on the guide rod by means of a rubber elastic body of substantially hollow cylindrical configuration.

3. Spot-type disc brake as defined in claim 2, in which a hollow sliding body is located between the rubber elastic body and the guide rod.

4. Spot-type disc brake as defined in claim 1, in which an elastic damping ring is arranged between the projecting annular collar and the brake caliper.

5. Spot-type disc brake as defined in claim 4, in which the limited clearance dimension between the radial annular collar and the brake caliper is adjustable by the damping ring.

6. A spot type disc brake for an automotive vehicle having a brake shoe on each side of a brake disc, and including a brake caliper straddling the brake disc and the brake shoes, a brake support member secured to the vehicle frame for receiving braking torque, a guide rod for slidably guiding the brake caliper on the brake support member, said brake caliper being provided with an actuating device to urge the brake shoes against the brake disc, said caliper being resiliently biased in the brake release direction and a friction element slidably supported by the brake support member for maintaining the resilient force constant independent of the thickness of pads on the brake shoes bearing against the brake disc, wherein said friction element comprises an annular disc mounted within a tubular sleeve allowing movement of the friction element in an axial direction in a limited clearance dimension, means on said sleeve for guiding the caliper to enable movement of said caliper axially in a brake release direction a distance corresponding to the elastic expansion of the brake caliper, an expansion element mounted on said guide rod enabling removal of the friction element annular disc from the guide rod by said expansion element, and in which said friction element annular disc is furnished with radial recesses into which tapering sections of the expansion element are inserted.

7. Spot-type disc brake as defined in claim 6, which the end of the sleeve which faces away from the brake support member is provided with a cup-shaped sealing cap preferably made of rubber elastic material.

8. Spot-type disc brake as defined in claim 6, in which a slotted tubular body is employed as a friction element.

9. Spot-type disc brake as defined in claim 8, in which the end of the tubular body which faces away from the brake support member has an outwardly extending radial enlargement and is expansible by means of a screw element.

* * * * *